July 24, 1956 W. A. RINGLER 2,755,963
BOTTLE SHIPPING AND CARRYING CARTONS
Filed Oct. 23, 1952 5 Sheets-Sheet 1

INVENTOR.
WILLIAM A. RINGLER
BY
Reuben J. Carlson
ATTORNEY.

July 24, 1956 W. A. RINGLER 2,755,963
BOTTLE SHIPPING AND CARRYING CARTONS
Filed Oct. 23, 1952 5 Sheets-Sheet 2
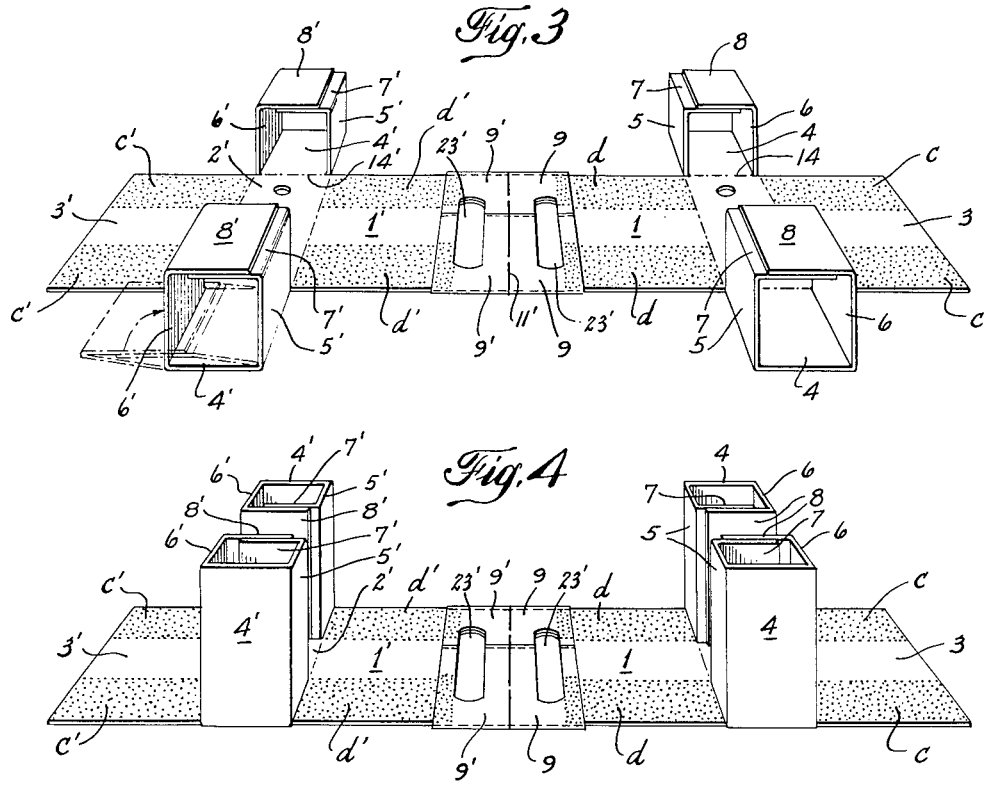
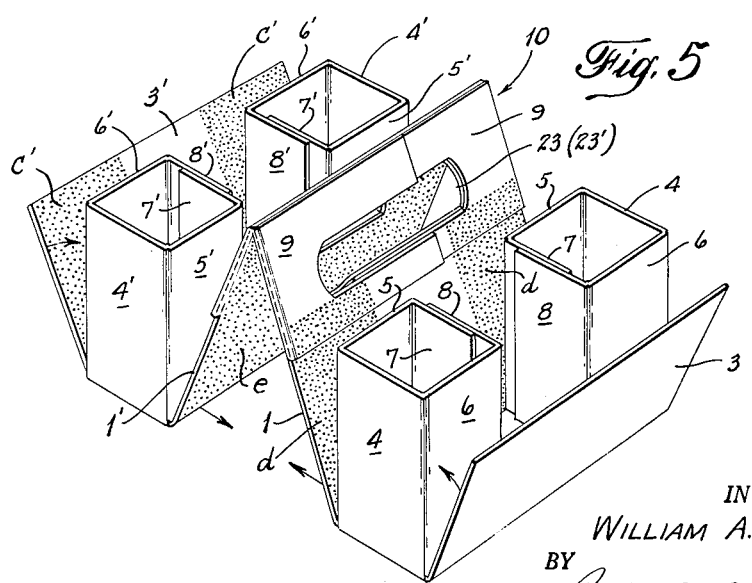
INVENTOR.
WILLIAM A. RINGLER
BY
ATTORNEY

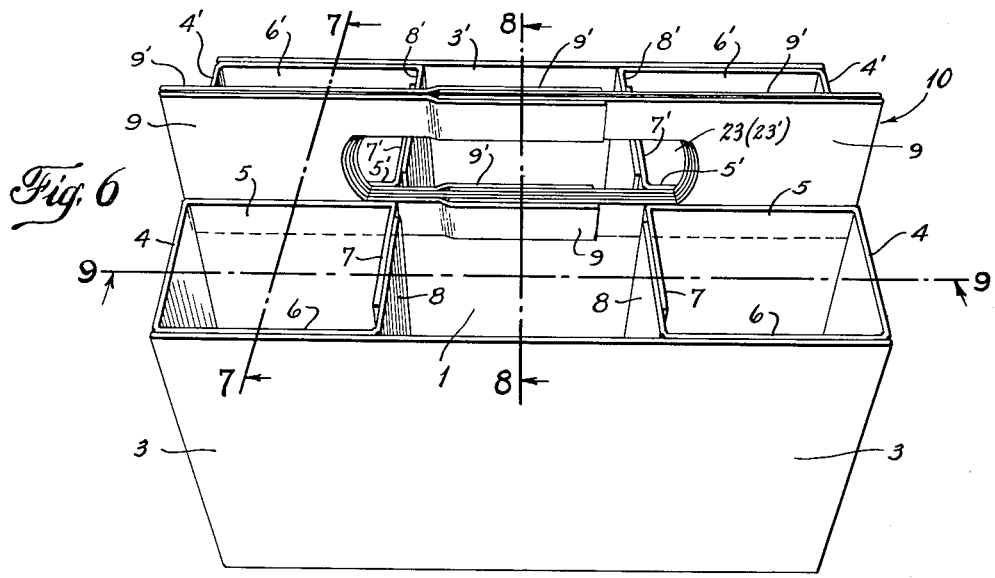
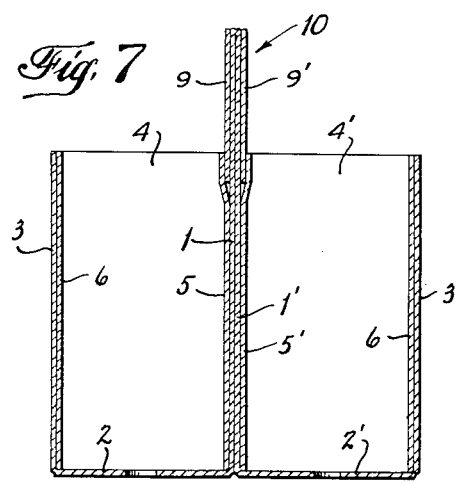
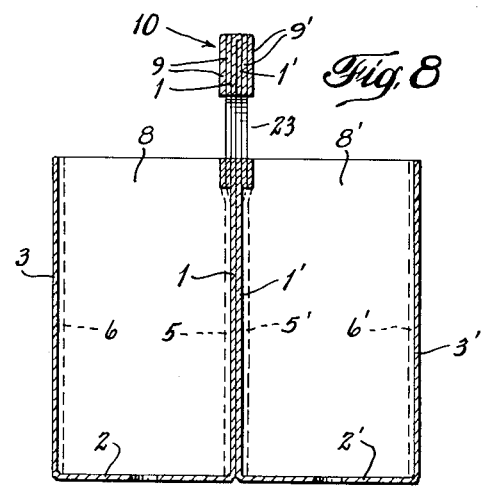
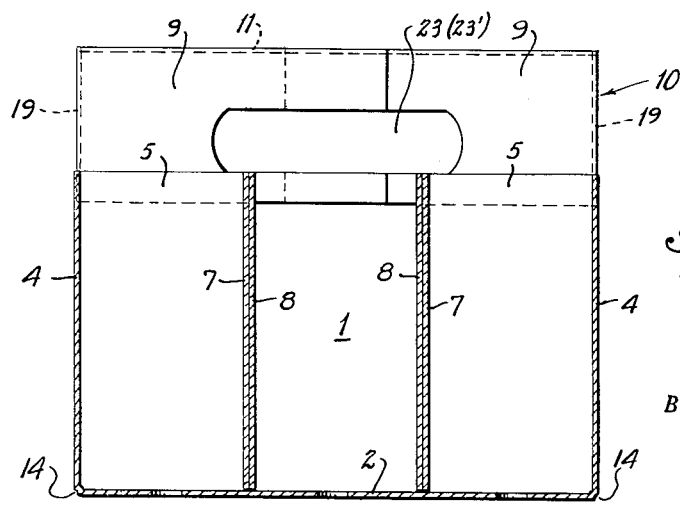

July 24, 1956 W. A. RINGLER 2,755,963
BOTTLE SHIPPING AND CARRYING CARTONS
Filed Oct. 23, 1952 5 Sheets-Sheet 4

INVENTOR.
WILLIAM A. RINGLER
BY
ATTORNEY

July 24, 1956  W. A. RINGLER  2,755,963
BOTTLE SHIPPING AND CARRYING CARTONS
Filed Oct. 23, 1952  5 Sheets-Sheet 5
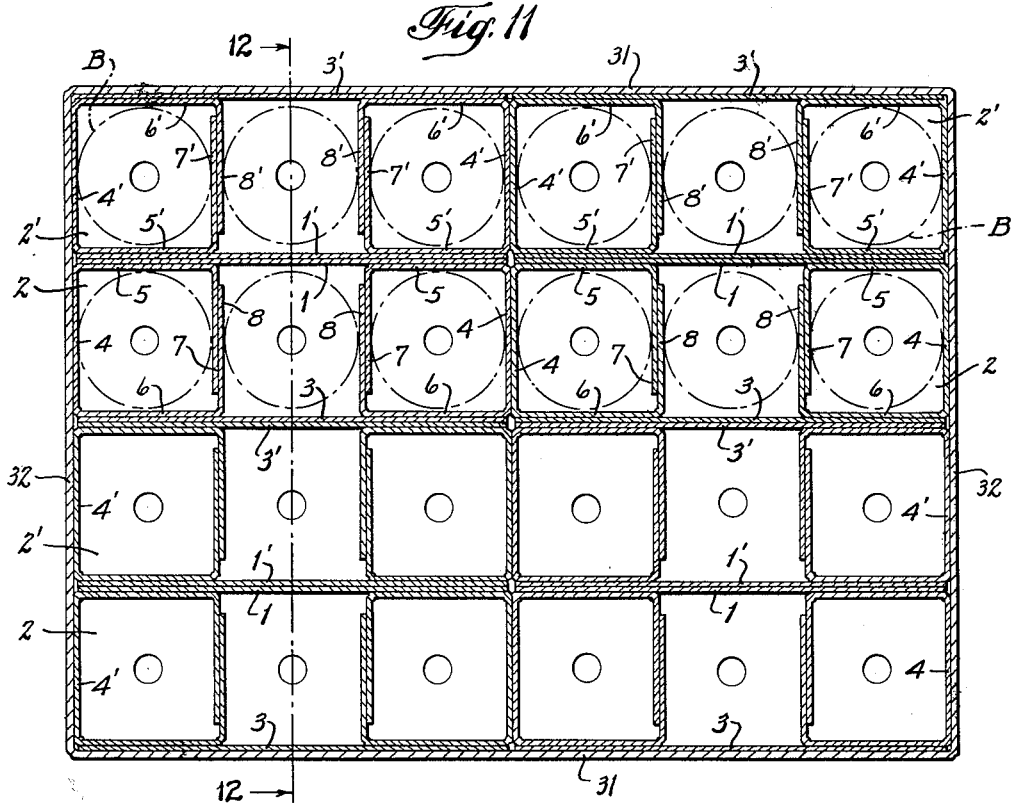
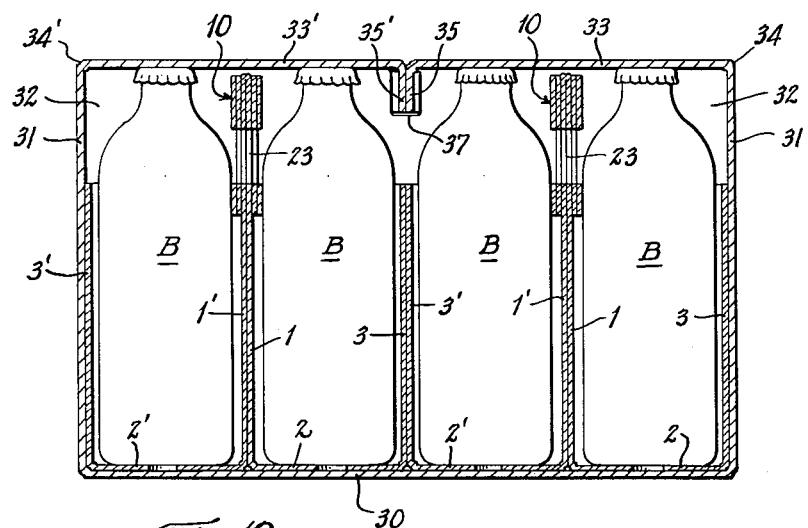
INVENTOR.
WILLIAM A. RINGLER
BY
ATTORNEY.

United States Patent Office 2,755,963
Patented July 24, 1956

2,755,963

BOTTLE SHIPPING AND CARRYING CARTONS

William A. Ringler, Wayne, Pa., assignor to The Gardner Board & Carton Co., Middletown, Ohio, a corporation of Ohio Application October 23, 1952, Serial No. 316,355

9 Claims. (Cl. 229—115)

This invention relates to bottle shipping and carrying cartons designed for snug insertion into shipping cases and to thus provide cushioned protection for the bottles nested therein during shipment and to additionally provide carrying means whereby a selected group of bottles may be delivered in packaged form to the consumer.

Nationally known and advertised brands of beverages often require rail or truck transportation for substantial distances from the place of manufacture to the distributors. To better serve the needs and requirements of nationally distributed beverages, glass container manufacturers have developed what is referred to as a single use glass bottle which can be manufactured and supplied at sufficiently low cost to permit discard of the bottle by the consumer, thereby avoiding the necessity of collecting and returning the more expensive and stronger bottles to the beverage manufacture for reuse.

It is presently customary to package the one use bottles as manufactured at the glass plant in a corrugated or fiberboard shipping case designed to contain twenty-four bottles. To reduce manufacturing costs, the single use bottles are usually made lighter and are consequently more fragile than the multi-use bottles. Shipping regulations impose stringent requirements as to the cushioning protection which must be provided for such single use bottles when shipped in packing cases. Such cushioning protection to the bottles is presently provided by longitudinal and transversely extending partitioning and cushioning strips inserted into the shipping case to define bottle receiving cells whose bottle separating walls are of sufficient thickness to adequately protect the bottles against breakage during shipment in accordance with established shipping regulations. The bottle filled shipping cases, with the protective partitioning strips therein, are shipped to the beverage manufacturer who removes the single use bottles from the shipping case, and after being washed and sterilized, the bottles are filled with beverage and labeled. In some cases the beverage filled and labeled bottles are reinserted in the strip partitioned shipping case in which they arrive for re-transportation and delivery to distant beverage distributors.

Since beverage consumers often prefer to purchase bottled beverages in a carrier containing six bottles, the beverage manufacturer or the distributor is then faced with the problem of packing the filled and labeled bottles in suitable bottle carriers for the convenient delivery of the bottled beverage to the consumer. It is accordingly customary for the beverage manufacturer to purchase paperboard bottle carriers of selected design which may be shipped and stored in collapsed condition to save shipping and storage space. Additional costs are accordingly incurred in erecting the collapsed carriers and inserting them in the shipping cases before or after the bottle filling operation. When the original bottle shipping case is to be reused for shipment of the beverage filled bottles, the partitioning strips must first be removed and discarded before the bottle carriers can be placed therein.

This invention is directed to the provision of an improved system of bottle handling and packaging whereby substantial economies can be effected. In accordance with this invention, sturdy bottle carriers are provided designed for assembly at the glass factory for nesting into shipping cases in a manner to provide adequate cushioned protection for the empty bottles as shipped to the beverage manufacturer, and subsequent cushioned protection for the beverage filled bottles as repacked therein by the beverage manufacturer for shipment to its distributors. These improved carriers thus permit the elimination of the separating partitions normally used to separate the empty bottles during shipment to the beverage manufacturer, and are so made that they need not be removed from the case at the beverage plant, but are designed to receive the beverage filled bottles while residing in the shipping case so that the shipping cases need only be reclosed for truck or rail transportation to the distant distributor. When the filled cases are received by the retailer, the bottle filled carriers are in order for ready removal from the case and delivery to the consumer. Thus, in addition to eliminating the costly waste resulting from the use of subsequently discarded bottle cushioning and separator strips in the shipping case, the beverage manufacturer saves the expense of purchasing, storing and erecting collapsible bottle carriers, the removal of the separator strips from the shipping case, and the insertion of the erected carriers into the shipping case.

The improved single use carriers of this invention can be manufactured substantially more economically than bottle carriers of the collapsible type and yet provide adequate cushioning protection to the bottles when moving either to or from the beverage manufacturer. These improved carriers are made from substantially rectangular blanks which may be cut and scored from stock sheets of selected paperboard or fiberboard material in a single pass through a cutting and scoring machine, after the stock sheet has first been imprinted and decorated on one side thereof only. These prepared blanks are designed to be stacked in limited space and shipped to a point in or adjacent to the bottle making plant where a carrier assembly machine would be installed to form the carriers from the flat blanks and thereupon insert the erected carriers into the shipping cases in substitution for the partition strips heretofore used.

These improved bottle carriers are so made as to snugly nest within the shipping case and to snugly retain the bottles within the closed shipping case against shifting movement. These carriers are constructed to provide a rigid multi-ply center partition having a four ply handle part which extends down to the bottom of the carrier which rests on the bottom of the shipping case, and with the top horizontal edge of the carriers positioned adjacent the closed cover of the shipping case, and with the top of the bottles in abutment against the closed cover so as to support and brace the closed covers when the cases are vertically stacked. Each carrier also is provided with full height cross partitions and full height side walls and end walls. The lower ends of the side and end wall panels and the center partition sections are integrally connected to the paired bottom panel sections in a manner to substantially stiffen and reinforce the same. The center partition sections and side panels are further reinforced by inner and outer liner sections extending inwardly from and integrally connected to the adjacent end panels. Each cross partition is formed by inturned overlapping flaps which are secured together to provide a double ply thickness of material between adjacent bottles.

Thus, when these carriers are nested within the shipping case and filled with bottles, the bottles separated at all points of possible contact by two or more plys of the sheet material from which the carriers are formed. While the blank area required to make this improved bottle carrier is approximately the same as the blank area required for carriers of the collapsible type heretofore made, the stock sheets from which these carrier blanks are cut need be approximately only half the thickness of the stock sheets required to make collapsible type carriers having only one ply thickness between adjacent bottles. As a result, a substantial saving in stock sheet costs is achieved.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which—

Fig. 3 is a perspective view of a partially folded blank as shown in Fig. 2 after the end cells have been expanded into rectangular form;

Fig. 4 is another perspective view of the blank assembly shown in Fig. 3 as the same would appear after the paired end cells have been swung to erected position and in supported relation upon the bottom panel sections;

Fig. 5 is a perspective view of the blank assembly shown in Fig. 4 as the same would appear when the center partition sections and side panels are undergoing folding erection;

Fig. 6 is a perspective view of the carrier as it would appear when fully assembled from the blank shown in Fig. 1;

Fig. 7 is a transverse cross section taken vertically through one end of the assembled carrier as the same would appear when viewed along line 7—7 of Fig. 6;

Fig. 8 is another transverse cross section taken vertically through the mid-section of the carrier as the same would appear when viewed along line 8—8 of Fig. 6;

Fig. 9 is a longitudinal cross section taken vertically through the carrier as the same would appear when viewed along line 9—9 of Fig. 6;

Figure 10:
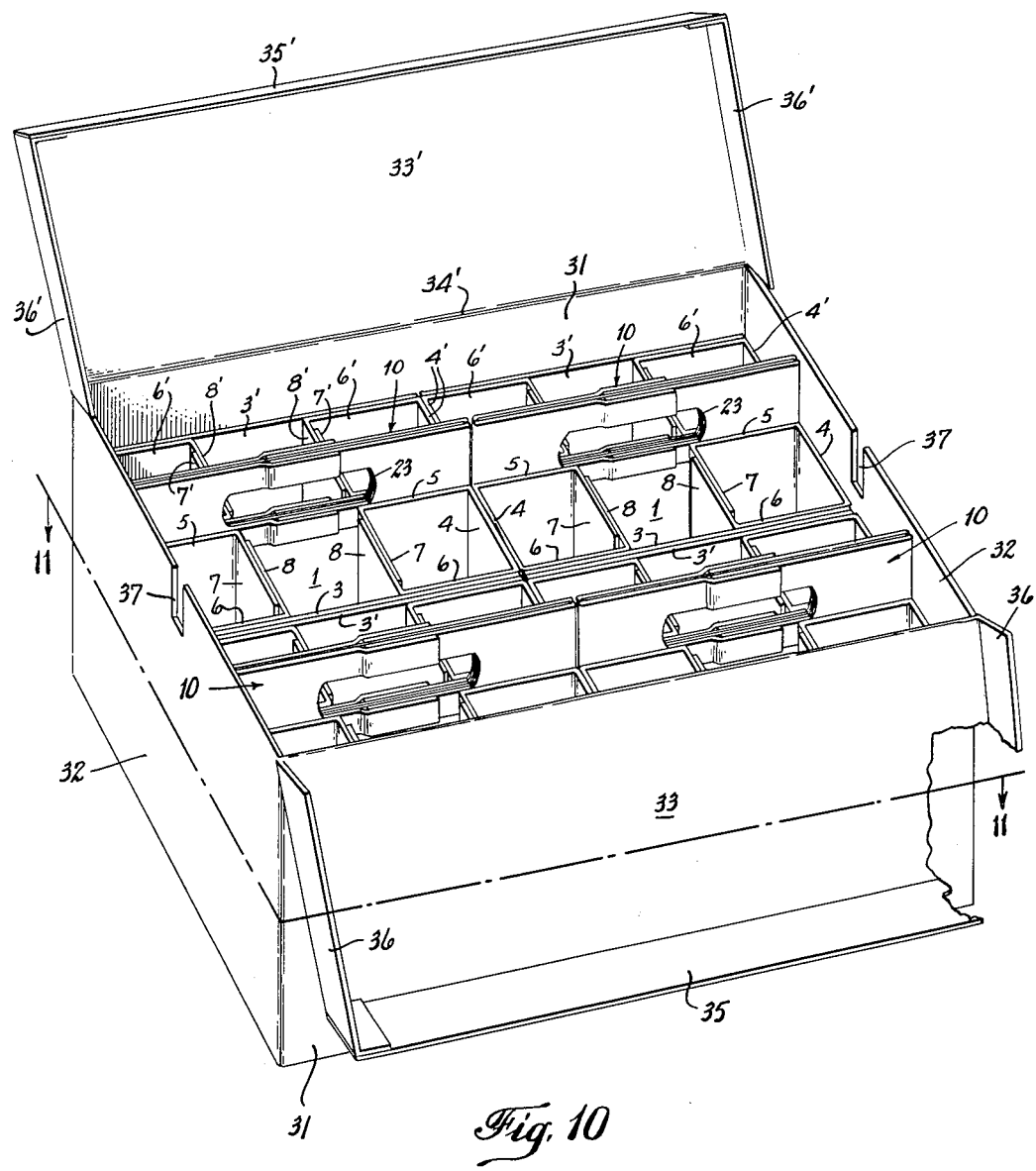
Fig. 10 is a perspective view of a shipping case showing the manner in which four carriers made in accordance with this invention are nested therein to provide a series of twenty-four bottle receiving cells separated by partitioning formed by the carrier walls.

Fig. 11 is a horizontal cross section of the shipping case and the carriers nested therein as the same would appear when viewed along line 11—11 of Fig. 10, this view also showing the manner in which the body walls of the bottles nested therein are separated and cushioned by two or more thicknesses of the sheet material from which the carriers are formed; and Fig. 12 is a transverse cross section of the shipping case and the bottle filled carriers nested therein as the same would appear when viewed along line 12—12 of Fig. 11, this view showing the manner in which the top of the bottles as contained in the nested carriers provide bracing support for the cover sections of the shipping case when in closed position.

Similar reference characters refer to similar parts throughout the several views of the drawings and the specification.

Bottle carriers may be made in accordance with this invention from truly rectangular blanks with substantially no waste of sheet stock in cutting. In their manufacture, large size paperboard or fiberboard stock sheets of selected quality are printed and decorated on one side thereof only. The stock sheets may then be scored and cut in a single pass through a cutting and scoring machine so as to produce the completed blanks ready for gluing and folding assembly to provide fully erected bottle carriers. The cut and score lines formed in the blank are so patterned and arranged that high speed gluing and folding assembly of the carriers may be attained with the resultant production of strong and serviceable bottle carriers at a very minimum of cost.

Figure 1:
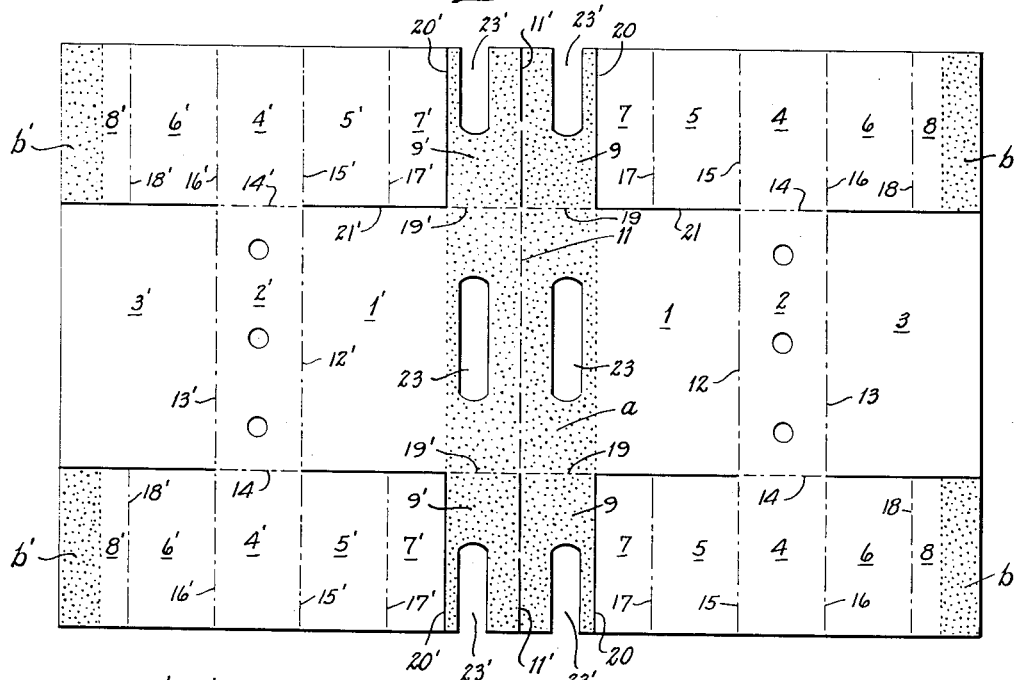
Fig. 1 is an inside face view of the carrier forming blank as cut and scored from a selected paperboard or fiberboard stock sheet, this view also showing adhesive applied to certain areas of the blank preliminary to the initial folding operation.

The rectangular carrier forming blank as shown in Fig. 1 is cut and scored to define two similar center partition sections 1 and 1' foldably joined along the top edge thereof by a longitudinal score 11. Similar bottom panel sections 2 and 2' are foldably connected to the lower ends of the center partition sections 1 and 1' along scores 12 and 12' which parallel the hinging score 11. Each bottom panel section 2 and 2' is of such shape and size as to support three bottles arranged in a row. Similar side wall panels 3 and 3' are foldably connected to the corresponding bottom panel sections 2 and 2' along folding scores 13 and 13' extending parallel to the scores 12 and 12'.

End cell forming parts integrally joined to both ends of both bottom panel sections 2 and 2' are so formed as to make maximum use of the blank area and provide sturdy end cells providing maximum protection to the bottles contained in the carrier. The two end cells associated with the bottom panel section 2 are each formed by an end wall section 4 hinged to the adjacent end of the bottom panel section 2 along a transverse score 14. An inner liner section 5 and an outer liner section 6 are foldably connected to the inner and outer side edges of each end wall section 4 by longitudinal scores 15 and 16 which extend substantially in alignment with the scores 12 and 13 which define the inner and outer edges of the bottom panel section 2. Each inner liner section 5 has a cross partition forming flap 7 foldably connected thereto along the longitudinal score 17, and each outer liner section 6 has a similar cross partition forming flap 8 hinged thereto along the longitudinal score 18.

The companion bottom panel section 2' is also provided with an end wall section 4' hinged to each end thereof along a transverse score 14'. Each end wall section 4' is provided with inner and outer liner sections 5' and 6' hinged thereto along the longitudinal scores 15' and 16' respectively. The inner and outer liner sections 5' and 6' are in turn also provided with cross partition forming flaps 7' and 8' hinged thereto along the respective longitudinal scores 17' and 18'.

The lower ends of the inner liner sections 5 and 5' and their associated cross partition flaps 7 and 7' are separated from the adjacent ends of the center partition sections 1 and 1' by transverse cuts 21 and 21' which are substantially in alignment with each other and with the adjacent transverse scores 14 and 14'. Similarly, the lower ends of the outer liner sections 6 and 6' and their associated cross partition flaps 8 and 8' are separated from the adjacent ends of the side wall panels 3 and 3' by transversely extending cuts 22 and 22' which are substantially in alignment with the adjacent transverse cuts 21 and 21' and the adjacent transverse scores 14 and 14' respectively.

The cross partition forming flaps 7 and 8 are designed to be secured together in overlapped relation to form a pair of spaced cross partitions of substantially double ply thickness at the mid-area thereof. The cross partition forming flaps 7' and 8' are likewise designed to be secured together in overlapped relationship to provide a pair of spaced cross partition sections of double ply thickness at the mid-area thereof. As assembled and erected, each end cell is defined by walls which are substantially the same width so that the end cells are substantially square in cross section and of a size to snugly receive the selected bottles therein, with each pair of end cells spaced apart a sufficient distance to define an intermediate bottle receiving cell therebetween.

The sheet material between the inner longitudinal edges of the adjacent cross partition flaps 7 and 7' may be gainfully employed to provide handle reinforcing flaps 9 and 9' designed to be adhesively secured to the upper handle forming portions of the center partition sections 1 and 1'. The paired handle reinforcing flaps 9 are hinged to the opposite ends of the center partition section 1 along transverse scores 19 substantially in alignment with the adjacent transverse cuts 21, and are separated from the adjacent cross partition flaps 7 by longitudinal cuts 20. Similarly, the paired handle reinforcing flaps 9' are foldably connected to the opposite ends of the center partition section 1' along the transverse scores 19' and are separated from the adjacent cross partition flaps 7' by longitudinal cuts 20'. Each transverse score 19' is substantially in alignment with the adjacent hinging score 19 and the adjacent transverse cut 21'. Each pair of adjacent panel reinforcing flaps 9 and 9' are preferably separated by a longitudinal cut 11' which is substantially in alignment with the longitudinal score 11 which connects the center partition sections 1 and 1'.

The center partition sections 1 and 1' are designed to extend when assembled into carrier form from the erected bottom panel sections 2 and 2' upwardly for a distance substantially above the upper edge of the side panels 3 and 3' so as to provide a handle part 10 for the carrier. Hand holes 23 are cut in the upper portions of the center partition sections 1 and 1' adjacent their top edge forming score 11. Corresponding hand hole slots 23' are formed in the handle reinforcing flaps 9 and 9' in a manner to register with the corresponding hand holes 23 when the handle reinforcing flaps 9 and 9' are folded over and adhesively secured to the upper portions of the center partition sections 1 and 1'.

In assembling the carrier from the blank shown in Fig. 1, the blanks are successively run through an assembling machine which first applies a continuous strip of adhesive *a* longitudinally across the inside face of the midsection of each blank, thereby applying the adhesive coating to the handle reinforcing flaps 9 and 9' and the upper handle forming portions of the center partition sections 1 and 1', as shown in Fig. 1. Strips of adhesive *b* and *b'* are also applied to the outer marginal edges of the cross partition forming flaps 8 and 8' as shown in Fig. 1.

Figure 2:
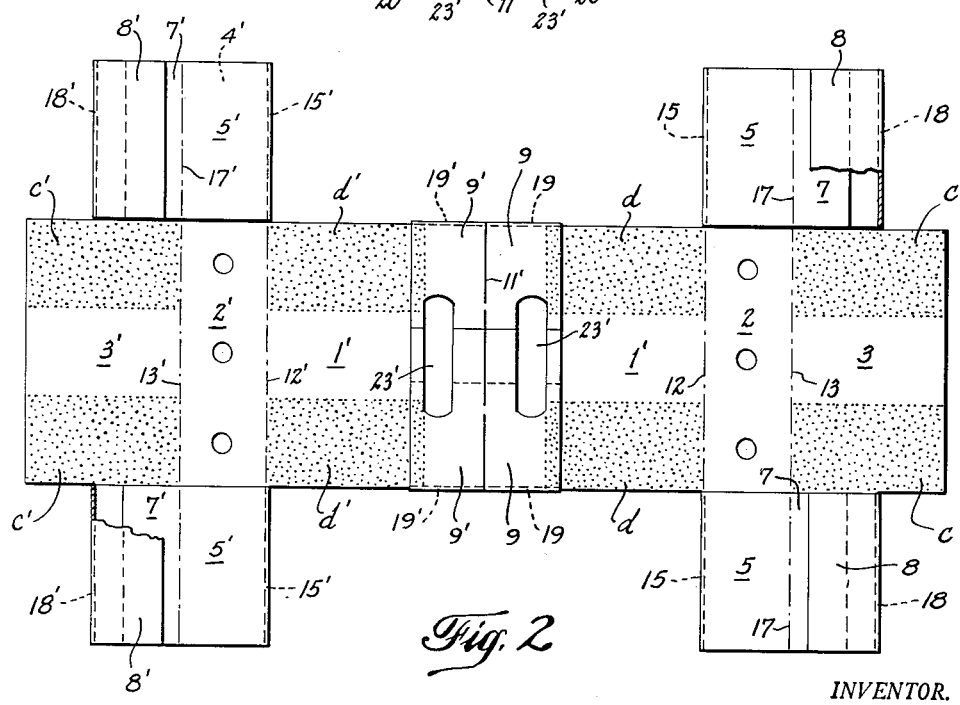
Fig. 2 is an inside face view of the blank shown in Fig. 1 as it would appear after completion of the first stage folding operation and wherein the handle reinforcing flaps have been folded and secured to the center partition sections and the end cell forming flaps have been folded and secured together to provide the four end cells in collapsed form.

In the first folding operation, the handle reinforcing flaps 9 and 9' are folded along the transverse scores 19 and 19' so as to be brought into adhesive contact with the upper handle forming portions of the center partition sections 1 and 1', the free ends of the handle reinforcing flaps 9 and 9 and the free ends of the handle reinforcing flaps 9' and 9' being permitted to overlap as indicated in Fig. 2.

In substantially the same or in a subsequent folding operation, the two inner liner sections 5 are folded over the adjacent end panels 4 along the aligned scores 15 so as to place the cross partition flaps 7 in overlying relationship to the adjacent outer liner sections 6. The cross partition flaps 8 are then folded along the aligned scores 18 so as to secure them to the adjacent overfolded cross partition flaps 7, thereby providing a pair of collapsed end cells foldably connected along the transverse scores 14 to the ends of the bottom panel section 2. In a similar manner and in a corresponding folding operation, the inner liner sections 5' are folded along the aligned scores 15' so as to overlie the adjacent end wall sections 4', with the cross partition flaps 7' overlapping the adjacent outer liner sections 6'. The cross partition flaps 8' are then folded along the aligned scores 18' and pressed into adhesively secured relation to the adjacent overfolded cross partition flaps 7', thereby completing the collapsed assembly of the end cells associated with the bottom panel section 2' as indicated in Fig. 2.

When the collapsed end cells are expanded into tubular form they will appear as shown in Fig. 3, and when the expanded end cells are swung into vertical position to rest upon the respective bottom panel sections 2 and 2' they will appear as shown in Fig. 4. As an alternative assembly procedure, a pair of mandrels may be provided around which the inner and outer liner sections 5 and 6 and their associated cross partition flaps 7 and 8 are folded, and a pair of corresponding mandrels may be provided around which the inner and outer liner sections 5' and 6' and their associated cross partition flaps 7' and 8' may be folded so as to produce two pairs of fully expanded end cells extending either in the horizontal position shown in Fig. 3 or in the vertical position as shown in Fig. 4.

When the end cells have been vertically erected in the form shown in Fig. 4, the side wall panel 3 is folded upwardly and adhesively secured to the outer liner sections 6 of the paired end cells associated with the bottom panel section 2, and the side wall panel 3' is similarly erected and adhesively secured to the outer liner sections 6' associated with the bottom panel secion 2'. Additionally, adhesive is applied in a manner to adhesively secure the inner liner sections 5 of one pair of end cells to the adjacent erected face of the associated center partition section 1, and adhesive is similarly applied in a manner to secure the inner liner sections 5' of the other pair of end cells to the adjacent erected face of the center partition section 1'.

Adhesive securement of the side wall panels 3 and 3' and the center partition sections 1 and 1' to the adjacent erected end cells associated with the bottom panel sections 2 and 2' may be variously effected. By way of example, corresponding patches of adhesive *c* and *c'* and *d* and *d'* may be applied directly to the upper faces of the side panels 3 and 3' and center partition sections 1 and 1' and the lower portions of the handle reinforcing flaps 9 and 9' while the same are in extended form as shown in Figs. 2, 3 and 4. Alternatively, strips of adhesive may be applied to the expanded outer liner sections 6 and 6' and the expanded inner liner sections 5 and 5' when the expanded cells are positioned as shown in Fig. 3 or as shown in Fig. 4, so as to thereby insure firm adhesive securement of the outer liner sections 6 and 6' and the inner liner sections 5 and 5' to the adjacent side panels 3 and 3' and adjacent center partition sections 1 and 1' and the associated lower portions of the handle reinforcing flaps 9 and 9' as fully erected.

A coating of adhesive *e* is also applied to the under face of either one or both of the center partition sections 1 or 1' as shown in Fig. 5 so as to firmly secure the center partition sections together in back to back relationship. The carrier assembly machine may be constructed to upfold the center partition sections 1 and 1' along the top hinging score 11 as shown in Fig. 5 substantially simultaneously with the upfolding movement of the side panels 3 and 3'. When the center partition sections 1 and 1' and side panels 3 and 3' have been upfolded as indicated in Fig. 5, inward clamping pressure may be exerted against the erected side panels 3 and 3' so as to move the center partition sections 1 and 1' together into adhesively secured back to back relationship, to press the inner liner sections 5 and 5' into a firm adhesive engagement against the adjacent faces of the center partition sections and the lower portions of the overlying handle reinforcing flaps 9 and 9', and to press the side panels 3 and 3' into firm adhesive engagement against the outer liner sections 6 and 6', thereby completing the assembly of the carrier in the form as shown in Figs. 6, 7, 8 and 9.

As thus constructed, the handle forming part 10 of the carrier is not less than four ply thickness throughout, with the center portion of the handle part immediately above and below the hand hole cutouts 23—23', as formed by the overlapped ends of the reinforcing flaps 9 and 9', being of six ply thickness. It will be noted that the lower edge portions of the handle reinforcing flaps 9 and 9' extend below and are overlapped by and adhesively secured to the upper portions of the inner liner sections 5 and 5' to provide a handle part having substantial stiffness and rigidity. The adjacent end cells are likewise separated by four thicknesses of sheet material as formed by the inner liner sections 5 and 5' and the center partition sections 1 and 1' as sandwiched therebetween. The adjacent intermediate cells are separated by a double thickness of sheet material as formed by the center partition sections 1 and 1'. The central area of each cross partition where they would be contacted by bottles inserted in the end and intermediate cells, is also of double ply thickness as formed by the overlapped portions of the cross partition forming flaps. The side panels 3 and 3' are sturdily braced by the adjacent outer liner sections 6 and 6' to which they are adhesively secured. The bottom panel sections 2 and 2' are substantially braced and stiffened by the side and end panels and the center partition sections to which they are integrally connected. A rigid bottle carrier of substantial strength is thus provided, even though the carrier blank is formed from a fiberboard stock sheet which calipers approximately only one half the thickness of the stock sheets required to produce bottle carriers of the collapsible type.

These improved carriers are particularly adapted for nesting in corrugated paperboard or fiberboard shipping cases in the manner illustrated in Figs. 10, 11 and 12. Such shipping cases are normally designed to contain twenty-four bottles arranged in four rows of six bottles each, with the bottles designed to rest upon the bottom wall 30. The side walls 31 and end walls 32 have a height which closely conforms to the height of the bottles to be contained in the case. The cover is usually formed by hinged closure flaps which may be sealed and closed with suitable adhesive tape. In one type of commonly used shipping case the cover part is made by a pair of hinged cover sections integrally and foldably connected along hinging scores 34 and 34' to the opposite side panels 31 of the case. The top panels 33 and 33' of the cover sections may be provided with end flanges 36 and 36' which telescope over the end walls 32 of the case, the respective end flanges 36 and 36' being joined by longitudinal stiffening flanges 35 and 35' which fall into adjacent abutment when the cover sections are moved into closed position as shown in Fig. 12, cutout notches 37 being provided in the upper edges of the end walls 32 into which the end portions and the longitudinal stiffening flanges 35 and 35' seat when the cover sections are in closed position.

Four of the six cell carriers made in accordance with this invention are designed to be inserted into the standard shipping case above described, an operation which can be conveniently performed as soon as the carriers are assembled. Two rows of carriers with two carriers in each row in end to end abutment are nested in the shipping case as indicated in Fig. 10, with the bottom panel sections 2 and 2' of the four carriers seating flat against the inside face of the bottom wall 30 of the shipping case. As thus arranged, one pair of end panel sections 4 and 4' of one carrier will be in close abutment against the adjacent end panel sections 4 and 4' of the adjacent carrier, providing a double ply wall structure which separates the bottles placed in the adjacent end cells of the two adjacent carriers. Likewise, adjacent carriers will present their adjacent side panels 3 and 3' in close abutment so that the adjacent end and intermediate cells of the two carriers will be separated by two plys of sheet material, with the adjacent end cells of adjacent carriers being separated by four plys of sheet material comprising the adjacent side panels 3 and 3' and their associated outer liner sections 6 and 6' as shown in Figs. 10 and 11. Also, one of the side panels 3 and 3' of each carrier will be positioned in abutting relation to the inside face of the case side walls 31, and one pair of end panel sections 4 and 4' of each carrier will be positioned in abutting relation to the inside face of the end walls 32 of the shipping case, thereby providing plural ply protection to the bottles positioned within the carrier cells extending around the inner perimeter of the shipping case. The end cells and the intermediate cells of each carrier are shaped to snugly receive the intended bottles therein, with these bottles in contact with the faces of the double ply overlap formed by the overlapping cross partition flaps 7 and 8 and 7' and 8'. It will thus be noted that each and every bottle placed in these carriers as nested in the shipping case are cushioned and protected by not less than two layers or plys of sheet material.

Shipping regulations specify the minimum thickness of paperboard or fiberboard which must be used to separate bottles contained in the individual cells of the shipping case. Bottle carriers as presently made and used have cross partitions and sometimes center partition portions which are made only of single ply thickness. Such carriers must accordingly be made of paperboard or fiberboard blanks of sufficient single ply thickness to meet shipping regulations, so that single ply cross partitions thereof will have the required thickness. Carriers made in accordance with this invention attain the required partitioning thickness by providing two plys of sheet material where necessary, so that the bottles contained in these carriers as nested in the shipping case are separated at all points of possible contact by not less than two plys of sheet material. As a result, the fiberboard or paperboard blanks from which these carriers are made need caliper only approximately one half the thickness of the blanks commonly employed in the manufacture of bottle carriers. In addition, these blanks may be cut with substantially no waste, and as a result, the stock sheet area required for these blanks is no greater than the area of the thinner and heavier stock sheets required to manufacture bottle carrier cartons as presently used.

Since these bottle carriers are designed to be nested into the shipping cases as manufactured, they are made rigid to facilitate their insertion into the shipping case. While made of lighter and thinner sheet material, these rigid bottle carriers are nevertheless substantially equal or superior in strength to bottle carriers of the collapsible type since the single ply bottom panel sections thereof are braced and reinforced by the end panel sections 4 and 4' integrally connected to the ends thereof and by the side panels 3 and 3' and the center partition sections 1 and 1' integrally connected to the sides thereof.

As placed in the shipping case, each pair of carriers whose end panel sections are in end to end abutment present their four ply handle parts 10 in longitudinal alignment as shown in Fig. 10, with the top horizontal edges 11 thereof substantially flush or just slightly below the top edges 32' of the end walls 32 of the shipping case. The top ends of the bottles as deposited in the case nested carrier cells are flush with the top edges of the case side and end walls to provide support for the adjacent top panels 33 and 33' of the cover sections when in closed position as shown in Fig. 12. As thus constructed and nested, the carriers will not shift in the shipping case. The vertical walls of the carriers are also of such height as to fully enclose the cylindrical portions of the bottles B as nested in the cells thereof, with only the upper tapered portions of the bottles extending above the cell defining walls of the carrier, and with the top ends of the bottles positioned substantially in abutment with the inside face of the cover top panels 33 and 33' when the cover sections are in closed position.

These improved carriers are thus designed to be nested as manufactured in the empty shipping cases to provide the bottle receiving cells therefor. The carrier filled shipping cases can then be advanced into the glass plant to receive the one use bottles in the carrier cells of the case. Upon closing the cover sections, the shipping cases can be shipped to the beverage plant where the new single use bottles are removed from the case with the carriers remaining therein. After washing, filling and labeling, the filled bottles may be reinserted into the carrier cells as nested in the shipping cases, and after closing and sealing, the shipping cases with the filled beverage bottles therein can be shipped to distant distributors for ultimate delivery to beverage retailers. Upon opening the cover sections of the shipping case, the retailer can readily withdraw each individual bottle filled carrier as a unit for convenient delivery to the consumer, or the bottle filled carriers may be withdrawn from the shipping case and vertically stacked in attractive display for individual selection by the consumer.

While certain novel features of this invention have been disclosed herein and are pointed out in the claims, it will be understood that various omissions, substitutions and changes may be made by those skilled in the art without departing from the spirit of this invention.

What is claimed is:

1. A bottle receiving and carrying carton formed from a substantially rectangular blank of sheet material which includes, a pair of center partition sections foldably connected along the top edge thereof and presenting hand hole openings in the upper portions thereof, a bottom panel section integrally connected to the lower end of each center partition section, a side wall panel having a free top edge integrally connected to each bottom panel section and in spaced relation to the adjacent center partition section, and a pair of end cell forming parts arranged in spaced relation on each of said bottom panel sections and defining an intermediate cell therebetween, each of said end cell forming parts including an end wall section integrally connected to the adjacent end of the bottom panel section, inner and outer liner sections integrally connected to the end wall section and respectively adhesively secured to the adjacent side wall panel and center partition section, and cross partition flaps extending inwardly from each pair of inner and outer liner sections and secured together in overlapped relation to define a cross partition separating the end cell from the adjacent intermediate cell, the combined width of each outer liner section and its associated cross partition flap being substantially equal to the height of the adjacent side panel to which the outer liner section is secured.

2. A relatively rigid article receiving and carrying carton formed from a substantially rectangular blank of sheet material which includes, a pair of center partition sections foldably connected along the top edge thereof and presenting hand hole openings in the upper portions thereof, handle reinforcing flaps integrally connected to the opposite end edges of the center partition sections and folded over the upper portions of said center partition sections to provide a plural ply handle part, a bottom panel section integrally connected to the lower end of each center partition section, a side wall panel having a free top edge integrally connected to each of said bottom panel sections in spaced relation to the adjacent center partition section, and a pair of end cell forming parts arranged in spaced relation on each of said bottom panel sections and defining an intermediate cell therebetween, each of said end cell forming parts including an end wall section integrally connected to the adjacent end of the bottom panel section, inner and outer liner sections integrally connected to the end wall section and respectively adhesively secured to the adjacent side wall panel and center partition section, and cross partition flaps extending inwardly from each pair of inner and outer liner sections and secured together in overlapped relation to define a cross partition separating the end cell from the adjacent intermediate cell, the combined width of each outer liner section and its associated cross partition flap being substantially equal to the height of the adjacent side panel to which the outer liner section is secured.

3. A relatively rigid twin compartmented bottle receiving and carrying carton formed from a substantially rectangular blank of sheet material and having cross partitions in each compartment defining bottle receiving cells which includes, a pair of spaced side panel sections each having a free top edge, a bottom panel section integrally connected to each of said side panel sections, a pair of center partition sections secured together in back to back relationship and integrally connected to said bottom panel sections and extending upwardly above the top edge of said side panel sections to provide handle forming portions, handle reinforcing flaps adhesively secured to the upper portions of said center partition sections providing a handle part having an overall thickness of not less than four plys, a finger insertion opening in said handle part by means of which the carton may be carried, an end panel section integrally connected to each end of each bottom panel section, an outer liner section integrally connected to each of said end panel sections and adhesively secured to the adjacent side panel section, an inner liner section integrally connected to each of said end panel sections and adhesively secured to the adjacent center partition section and the lower portion of the adjacent handle reinforcing flap, inturned cross partition forming flaps integrally connected to each pair of inner and outer liner sections and secured together in overlapped relation to provide a cross partition having a double ply bottle contacting portion medially thereof, the combined width of each outer liner section and its associated cross partition flap being substantially equal to the height of the adjacent side panel to which the outer liner section is secured.

4. A substantially rectangular blank of sheet material cut and scored to form a relatively rigid cellular carton including, a pair of center partition sections foldably connected along a longitudinal score extending medially of the blank, a bottom panel section foldably connected along a longitudinal score to the bottom end of each center partition section, a side panel section having a free top edge foldably connected along a longitudinal score to each bottom panel section, an end panel section foldably connected to each end of each bottom panel section along a transverse score, and an outer liner section and a cross partition flap foldably joined by longitudinal scores in side by side relationship to each of said end panel sections and separated from the adjacent end edge of the adjacent side wall section by a transverse cut, the combined width of each outer liner section and its associated cross partition flap being substantially equal to the height of the adjacent side panel to which the outer liner section is to be secured.

5. A substantially rectangular blank of sheet material cut and scored to form a relatively rigid cellular carton including, a pair of center partition sections foldably connected along a longitudinal score extending medially of the blank, a bottom panel section foldably connected along a longitudinal score to the bottom end of each center partition section, a side panel section having a free top edge foldably connected along a longitudinal score to each bottom panel section, an end panel section foldably connected to each end of each bottom panel section along a transverse score, an inner liner section and a cross partition forming flap foldably joined by longitudinal scores in side by side relationship to each of said end panel sections and separated from the adjacent end edge of the center partition section by a transverse cut, and an outer liner section and a second cross partition flap foldably joined by longitudinal scores in side by side relationship to each of said end panel sections and separated from the adjacent end edge of the adjacent side wall section by a transverse cut, the combined width of each outer liner section and its associated cross partition flap being substantially equal to the height of the adjacent side panel to which the outer liner section is to be secured.

6. A substantially rectangular blank of sheet material cut and scored to form a relatively rigid cellular carton including, a pair of center partition secttions having apertured handle forming portions foldably connected along a longitudinal score extending medially of the blank, a handle reinforcing flap foldably joined by a transverse score to each end edge of each handle forming portion of said center partition sections, a bottom panel section foldably connected along a longitudinal score to the bottom end of each center partition section, a side panel section having a free top edge foldably connected along a longitudinal score to each bottom panel section, an end panel section foldably connected along a transverse score to each end of each bottom panel section, and an outer liner section and a cross partition flap foldably joined to each other and to each end panel section in side by side relationship along longitudinal scores and separated from the adjacent end edge of the adjacent side wall section by a transverse cut, the combined width of each outer liner section and its associated cross partition flap being substantially equal to the height of the adjacent side panel to which the outer liner section is to be secured.

7. A substantially rectangular blank of sheet material cut and scored to form a relatively rigid cellular carton including, a pair of center partition sections having apertured handle forming portions foldably connected along a longitudinal score extending medially of the blank, a handle reinforcing flap foldably joined by a transverse score to each end edge of each handle forming portion of said center partition sections, a bottom panel section foldably connected along a longitudinal score to the bottom end of each center partition section, a side panel section having a free top edge foldably connected along a longitudinal score to each bottom panel section, an end panel section foldably connected along a transverse score to each end of each bottom panel section, an inner liner section and a cross partition flap foldably connected to each other and to each of said end panel sections along longitudinal scores and separated from the adjacent end edge of the adjacent center partition section by a transverse cut, and an outer liner section and a second cross partition flap foldably joined to each other and to each end panel section along longitudinal scores and separated from the adjacent end edge of the adjacent side panel section by a transverse cut, the combined width of each outer liner section and its associated cross partition flap being substantially equal to the height of the adjacent side panel to which the outer liner section is to be secured.

8. The method of making a multi-cell carrier carton formed from a substantially rectangular blank of sheet material and having a pair of center partition sections integrally hinged by a longitudinal score along the top edges thereof, a bottom panel section integrally hinged by a longitudinal score to the lower end of each of said center partition sections, a side panel having a free top edge integrally hinged along a longitudinal score to each bottom panel section, and cell-forming parts each including an end panel section integrally hinged by a transverse score of each end of each bottom panel section, an inner liner section and a cross partition flap integrally hinged to each other and to each of said end panel sections along longitudinal scores and separated from the adjacent end edge of the adjacent center partition section by a transverse cut, and an outer liner section and a second cross partition flap integrally hinged to each other and to each end panel section along longitudinal scores and separated from adjacent end edge of the adjacent side panel section by a transverse cut, the steps which include, applying adhesive to the inside face of the cross partition flaps which are integrally hinged to the outer liner sections, collapse folding each pair of inner and outer liner sections to thereby overlap the adjacent cross partition flaps associated therewith in secured relation and thus provide a tubular cell part in collapsed form, applying adhesive to the inside face of the outer portions of said side panel sections and center partition sections, erecting said collapsed cell parts into expanded form and swinging the same into vertically extending seated position on the adjacent bottom panel section, buckling said center partition sections upwardly along their longitudinally extending connecting score and substantially simultaneously raising said side panel sections, and thereafter pressing said side panels, erected cell forming parts and center partition sections together in juxtaposed relationship to thereby secure the side panels to the adjacent outer liner sections and the center partition sections to the adjacent inner liner sections to provide a carrier in erected form.

9. The method of making a multi-cell carrier carton formed from a substantially rectangular blank of sheet material and having a pair of center partition sections integrally hinged by a longitudinal score along the top edges thereof, a bottom panel section integrally hinged by a longitudinal score to the lower end of each of said center partition sections, a side panel having a free top edge integrally hinged along a longitudinal score to each bottom panel section, and cell-forming parts each including an end panel section integrally hinged by a transverse score of each end of each bottom panel section, an inner liner section and a cross partition flap integrally hinged to each other and to each of said end panel sections along longitudinal scores and separated from the adjacent end edge of the adjacent center partition section by a transverse cut, and an outer liner section and a second cross partition flap integrally hinged to each other and to each end panel section along longitudinal scores and separated from adjacent end edge of the adjacent side panel section by a transverse cut, the steps which include, applying adhesive to the inside face of the cross partition flaps which are integrally hinged to the outer liner sections, collapsed folding each pair of inner and outer liner sections to thereby overlap the adjacent cross partition flaps associated therewith in secured relation and thus provide a tubular cell part in collapsed form, applying adhesive to the inside face of the outer portions of said side panel sections and center partition sections, erecting said collapsed cell parts into expanded form and swinging the same into vertically extending seated position on the adjacent bottom panel section, applying adhesive to the outside face of at least one of said center partition sections, buckling said center partition sections upwardly along their longitudinal extending connecting score and substantially simultaneously raising said side panel sections, and thereafter pressing said side panels, erected cell forming parts and center partition sections together in juxtaposed relationship to thereby secure the side panels to the adjacent outer liner sections and the center partition sections to the adjacent inner liner sections to provide a carrier in erected form.

References Cited in the file of this patent

UNITED STATES PATENTS

| | | |
|---|---|---|
| 1,808,922 | Gallistel | June 9, 1931 |
| 2,575,654 | Casler | Nov. 20, 1941 |
| 2,372,351 | Arneson | Mar. 26, 1945 |
| 2,407,798 | Ringler | Sept. 17, 1946 |
| 2,602,581 | Stern | July 8, 1952 |
| 2,615,749 | Kuchel | Oct. 28, 1952 |

FOREIGN PATENTS

| | | |
|---|---|---|
| 800,026 | France | Apr. 2, 1935 |